US009861001B1

(12) United States Patent
Miller et al.

(10) Patent No.: US 9,861,001 B1
(45) Date of Patent: Jan. 2, 2018

(54) RUGGEDIZED PROTECTIVE CASE WITH EXTENDABLE EASEL/KICKSTAND FOR MOBILE DEVICE

(71) Applicant: MobileDemand LC, Hiawatha, IA (US)

(72) Inventors: Matthew Miller, Cedar Rapids, IA (US); Steven R. Kunert, Cedar Rapids, IA (US)

(73) Assignee: MobileDemand LC, Hiawatha, IA (US)

( * ) Notice: Subject to any disclaimer, the term of this patent is extended or adjusted under 35 U.S.C. 154(b) by 0 days.

(21) Appl. No.: 15/454,605

(22) Filed: Mar. 9, 2017

Related U.S. Application Data

(63) Continuation-in-part of application No. 15/441,660, filed on Feb. 24, 2017.

(60) Provisional application No. 62/305,885, filed on Mar. 9, 2016, provisional application No. 62/299,360, filed on Feb. 24, 2016.

(51) Int. Cl.
| | |
|---|---|
| *H04B 1/38* | (2015.01) |
| *H05K 5/02* | (2006.01) |
| *G06F 1/16* | (2006.01) |
| *H05K 5/06* | (2006.01) |

(52) U.S. Cl.
CPC ......... *H05K 5/0234* (2013.01); *G06F 1/1616* (2013.01); *G06F 1/1626* (2013.01); *G06F 1/1681* (2013.01); *H05K 5/069* (2013.01)

(58) Field of Classification Search
CPC .... H05K 5/0234; H05K 5/069; G06F 1/1616; G06F 1/1626; G06F 1/1681
See application file for complete search history.

(56) References Cited

U.S. PATENT DOCUMENTS

| 2013/0175200 | A1 | 7/2013 | Poon | |
|---|---|---|---|---|
| 2014/0071607 | A1* | 3/2014 | Frinak | G06F 1/1624 361/679.09 |
| 2015/0156905 | A1* | 6/2015 | Blochlinger | F16F 1/027 206/736 |
| 2015/0241925 | A1 | 8/2015 | Seo | |
| 2015/0362962 | A1 | 12/2015 | Lee | |
| 2017/0045920 | A1* | 2/2017 | Armstrong | G06F 1/1669 |
| 2017/0156464 | A1* | 6/2017 | Hurst | A45C 11/00 |

* cited by examiner

*Primary Examiner* — Nguyen Vo
(74) *Attorney, Agent, or Firm* — Suiter Swantz pc llo

(57) ABSTRACT

A ruggedized protective case for a laptop, tablet, smartphone, or other like mobile communications or computing device may include a rigid inner housing shielding the reverse face of the mobile device and a flexible, rubberized outer housing including reinforced impact-absorbing corners. The case may include a kickstand/easel hingedly attached to the rear inner housing, positionable by a user for holding the mobile device at any desired angle to a substantially horizontal surface. The kickstand may be extended by an easel bracket to support a portable keyboard of the mobile device for vehicular use.

8 Claims, 9 Drawing Sheets

US 9,861,001 B1

RUGGEDIZED PROTECTIVE CASE WITH EXTENDABLE EASEL/KICKSTAND FOR MOBILE DEVICE

CROSS-REFERENCE TO RELATED APPLICATIONS

The instant application claims priority under 35 U.S.C. §120 as a continuation-in-part of U.S. patent application Ser. No. 15/441,660 filed Feb. 24, 2017, entitled RUGGEDIZED PROTECTIVE CASE WITH INTEGRATED EASEL KICKSTAND FOR MOBILE DEVICE. The instant application claims priority under 35 U.S.C. §119(e) to provisional U.S. Patent Application Ser. No. 62/299,360, filed on Feb. 24, 2016, and Ser. No. 62/305,885, filed Mar. 9, 2016. Said U.S. patent application Ser. No. 15/441,660, 62/299,360, and 62/305,885 are herein incorporated by reference in their entirety.

SUMMARY

Said U.S. patent application Ser. No. 14/137,502 is herein incorporated by reference in its entirety.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1A:
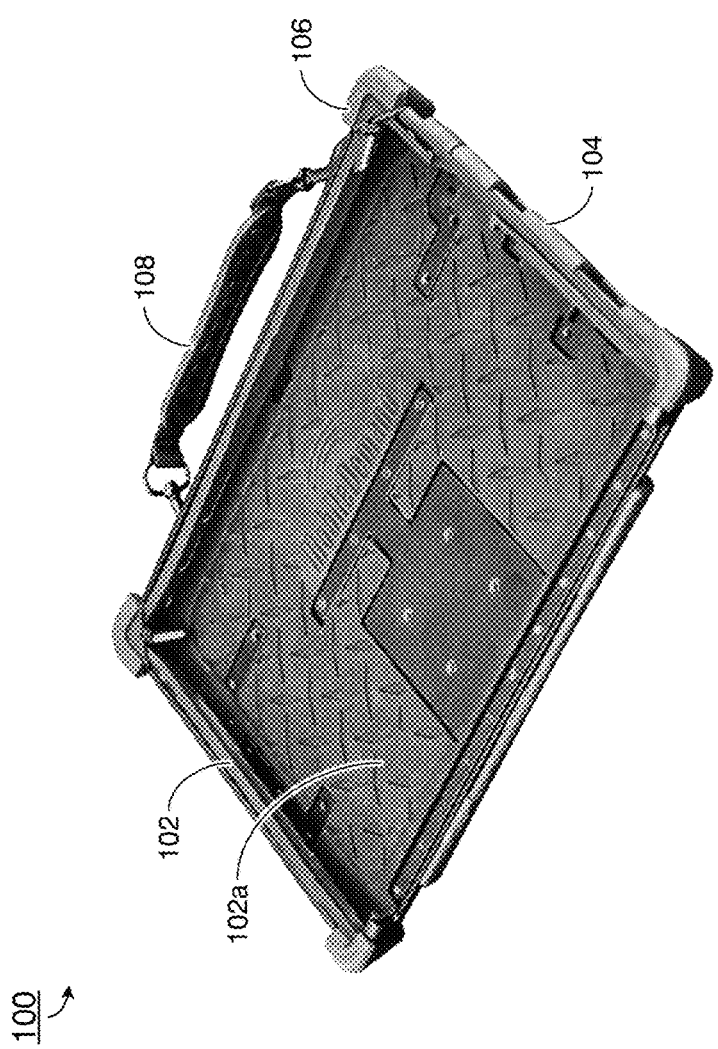
FIG. 1A is an overhead view of an exemplary embodiment of a ruggedized protective case according to the inventive concepts disclosed herein.
Figure 1B:
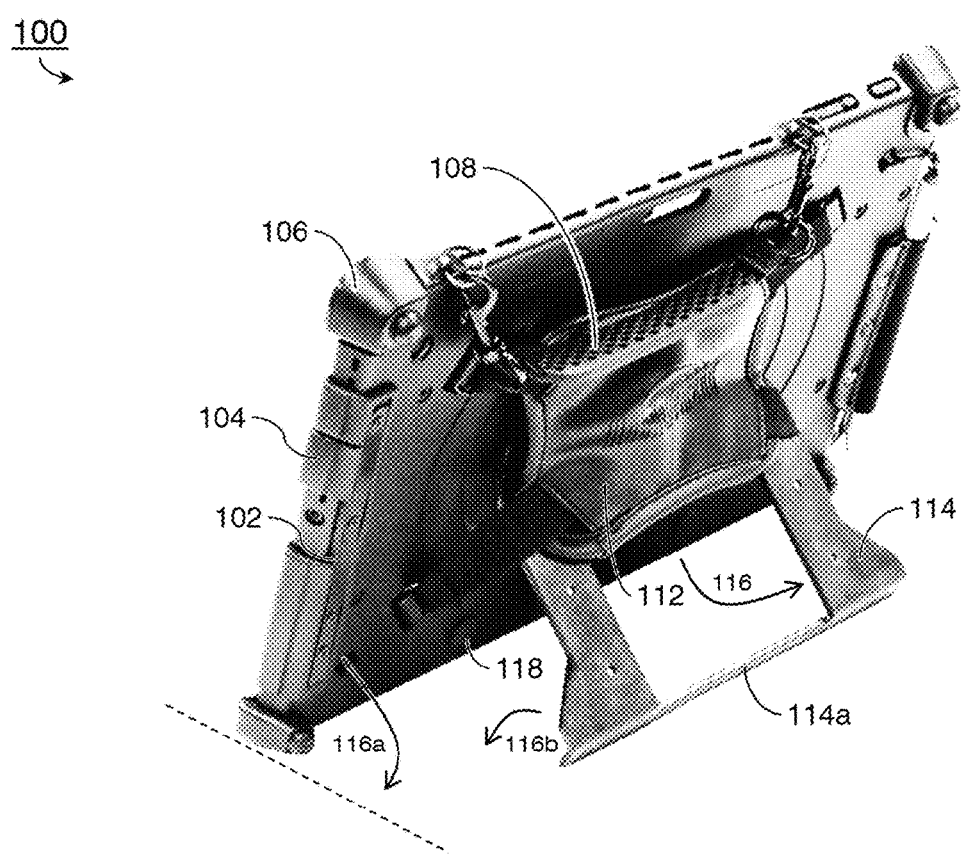
FIG. 1B is a rear view of the protective case of FIG. 1A.
Figure 1C:
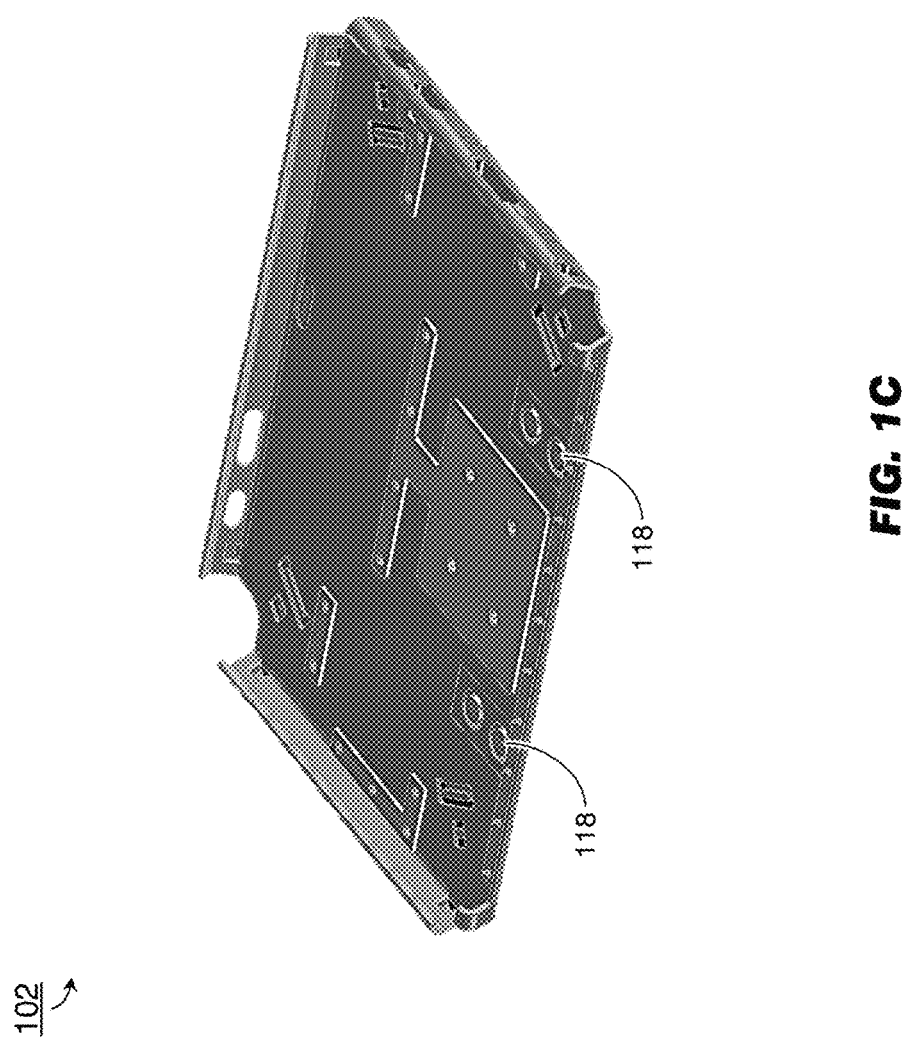
FIG. 1C is an overhead view of the inner housing of FIG. 1C.

Referring to FIGS. 1A through 1C, a ruggedized protective case 100 for a mobile device is shown. The protective case 100 may be sized to a particular mobile device or class thereof; for example, the protective case 100 may be configured to partially or fully enclose the rear face (e.g., the face opposite the screen or display surface) of a tablet or smartphone, protecting the mobile device from shock or from the elements. The protective case 100 may include a rigid inner housing 102 molded from enterprise-grade high impact plastic or a similar lightweight, durable, rigid material. The inner housing 102 may contact the rear face of the mobile device via an inner surface 102a. The protective case 100 may include a flexible or rubberized outer housing 104 removably attachable to, and partially enclosing, the inner housing 102. For example, the outer housing 104 may include protective coverings corresponding to gaps in the inner housing 102 and hingedly attached to the outer housing, the protective coverings insulating ports or drives (e.g., USB ports, power inputs) positioned in the edges of the mobile device. Further, the outer housing 104 may include reinforced rubberized bumpers (106) providing added impact protection to the corners of the mobile device; it is contemplated that the bumpers 106 may provide sufficient protection to meet MIL-STD-810G testing standards. The protective case 100 may include one or more carrying handles 108 for transport of the mobile device. The protective case 100a may include an adjustable carrying strap 112 attached to the inner housing 102.

The protective case 100 may include a kickstand 114 comprised of a rigid metal core overmolded in rubber or a like synthetic rubberized material. The kickstand 114 may be attached to the exterior of the inner housing 102 by one or more friction hinges, incorporating hinge knuckles and pivot pins to create tension forcing the outer end (114a) of the kickstand away from the inner housing 102 in a radial fashion, separating the kickstand 114 from the inner housing 102. The kickstand 114 may be manipulated by a user to hold the kickstand at any desired angle (116) from the inner housing 102 to which it is positioned (as opposed to being positionable to one of a finite set of detent positions) through a rotational angle of substantially 170-180 degrees, thus positioning the mobile device 110 at an angle (116a) to a substantially flat, horizontal working surface. For example, should the kickstand 114 be extended to the maximum desired angle, both the kickstand 114 and the mobile device 110 (e.g., the screen or display surface of the mobile device) would be substantially parallel to the flat surface against which the mobile device 110 is positioned. It may be noted that the angle 116 between the kickstand 114 and the inner housing 102, the angle 116a between the mobile device 110 and the working surface, and the angle 116b between the kickstand 114 and the working surface may define a triangle, and thus total 180 degrees between the three angles 116, 116a-b. The rubberized outer end 114a of the kickstand 114 may serve to hold the kickstand 114, and thus the mobile device 110, in the desired orientation to which it has been positioned on the working surface. As the metal core of the kickstand 114 may include a passive magnetic material, the inner housing 102 may include one or more magnets 118 for holding the kickstand 114 in place when repositioned to a substantially flush position against the inner housing 102. The magnets 118 may be appropriately shielded to insulate the mobile device 110 and its components from magnetic corruption.

Figure 2A:
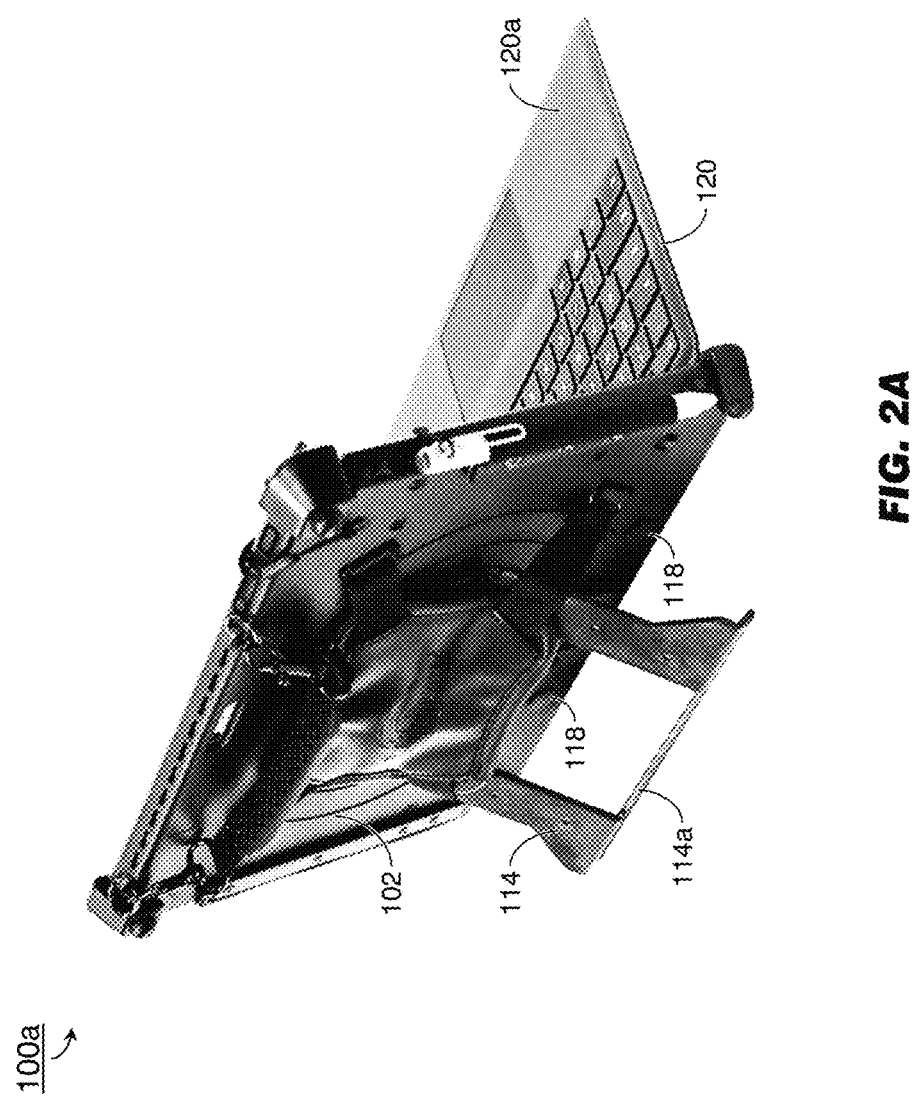
FIGS. 2A and 2B are side views of the protective case of FIG. 1A, including a mobile device.
Figure 2B:
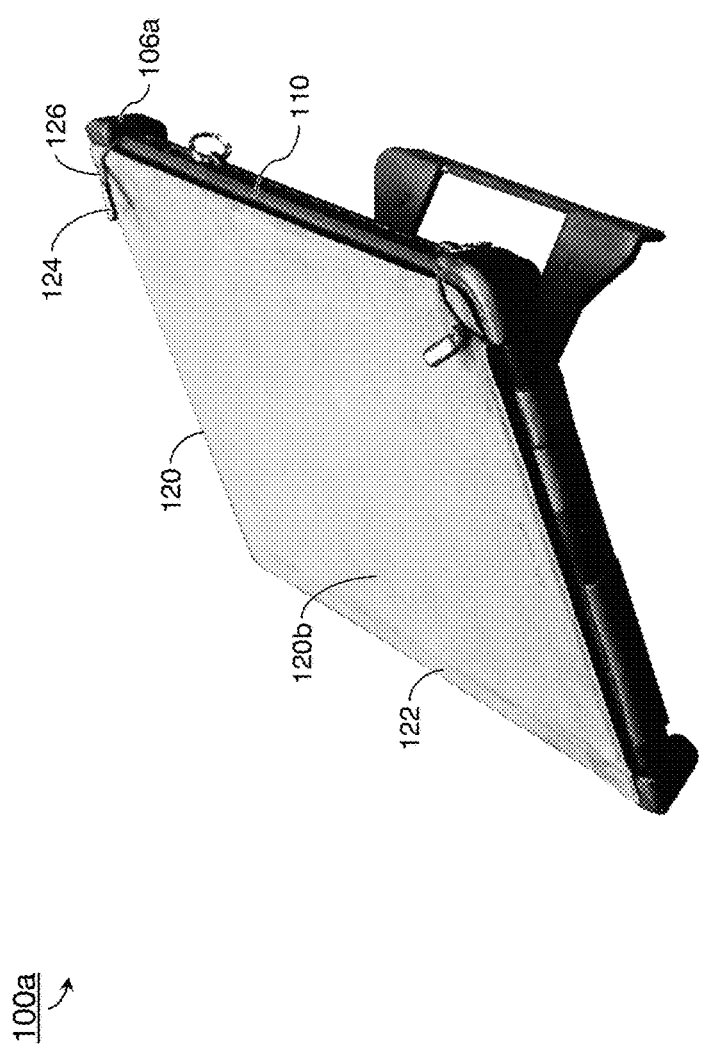

Referring now to FIGS. 2A and 2B, the protective case 100a may be implemented and may function similarly to the protective case 100 of FIG. 1, except that the protective case 100a may include a mobile device 110. The mobile device 110 may include a portable keyboard 120 for use with the mobile device. For example, the portable keyboard 120 may comprise electronics housed within a flexible, rubberized sheet, the electronics connected to keys and touch-sensitive surfaces situated within an inner surface (120a). Referring in particular to FIG. 2B, the portable keyboard 120 may be magnetically attachable (122) to the mobile device 110 and have an outer surface (120b) serving as a protective cover for the mobile device 110 and its display surface. One or more reinforced rubberized bumpers (106a) may include corner tabs 124 attached to the reinforced rubberized bumpers by spring-loaded cables (126). For example, when the outer surface 120b is positioned to cover the mobile device 110 (as shown by FIG. 2B), the corner tabs 124 may be extended from the reinforced rubberized bumpers 106*a*, retracting automatically to secure the portable keyboard 120 to the mobile device 110.

Figure 3:
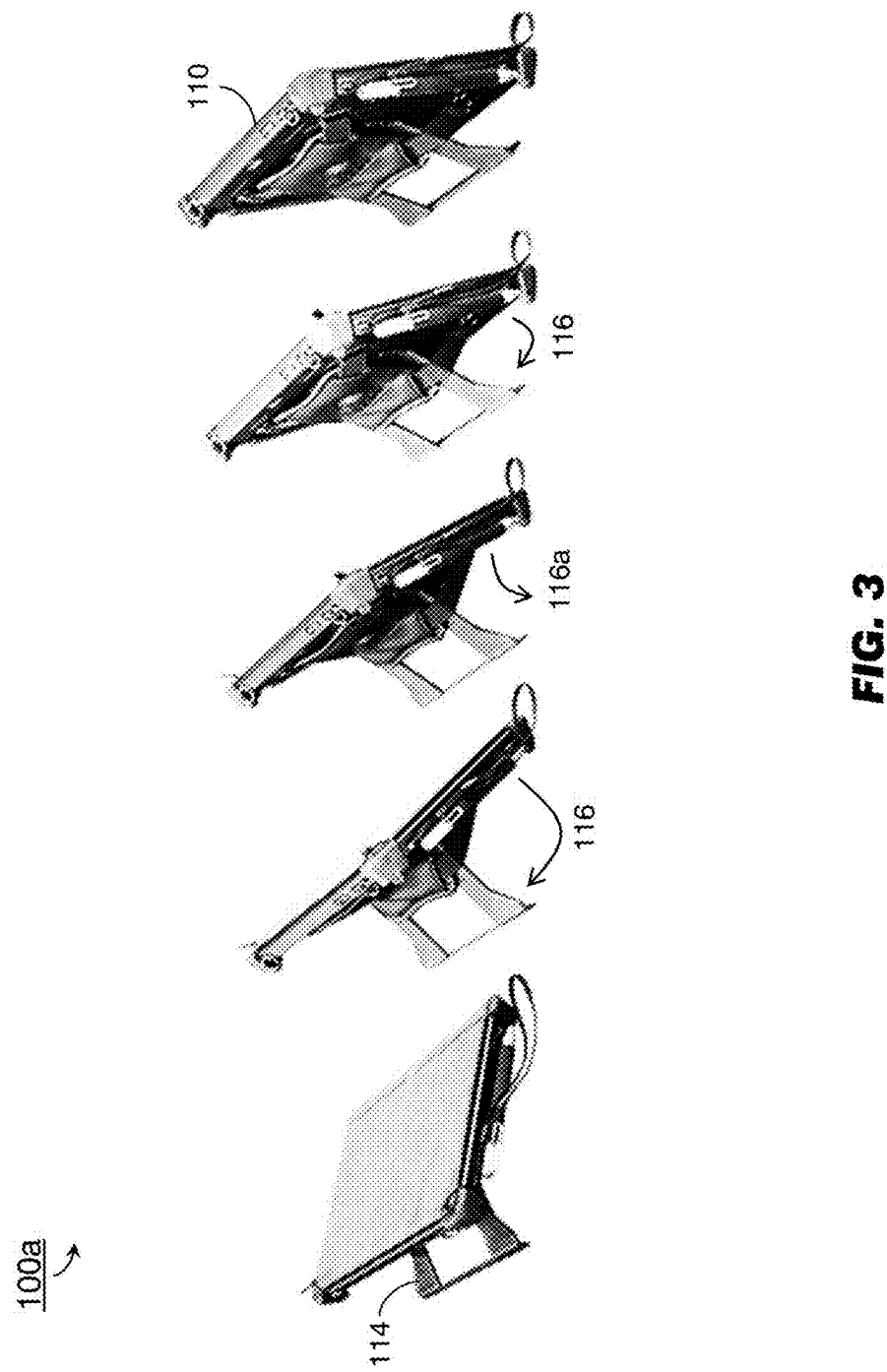
FIG. 3 illustrates operations of the protective case of FIG. 2B.

Referring to FIG. 3, the kickstand 114 may be repositioned to any desired angle 116 to the outer housing 102 in order to position the mobile device 110 at a desired angle (116*a*) to a working surface.

Figure 4:
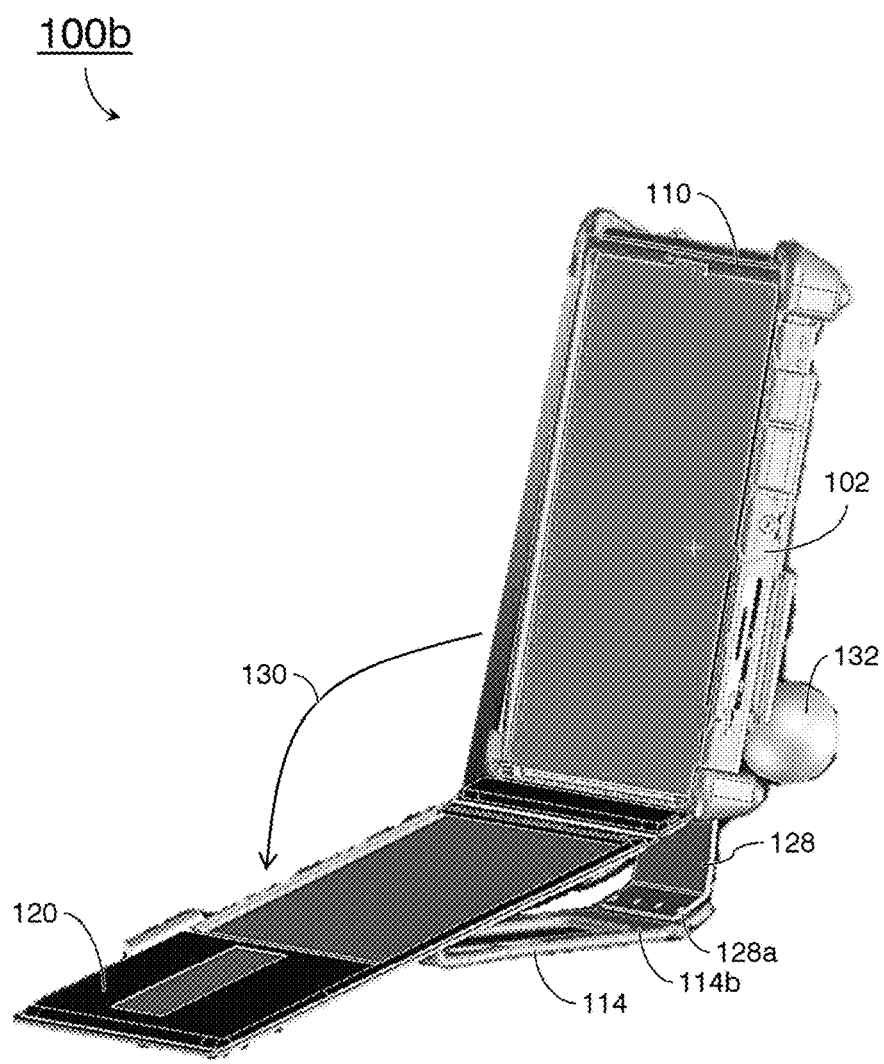
FIGS. 4 through 6 illustrate the addition of an easel bracket to the ruggedized protective case of FIG. 1.
Figure 5:
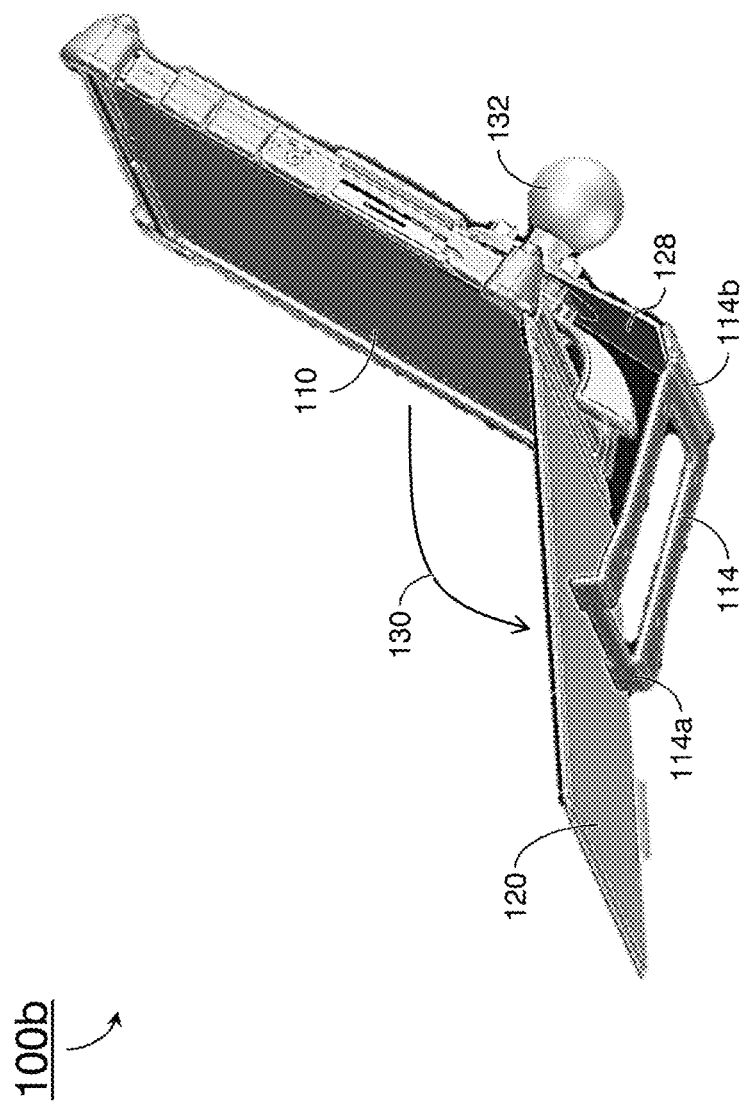
Figure 6:
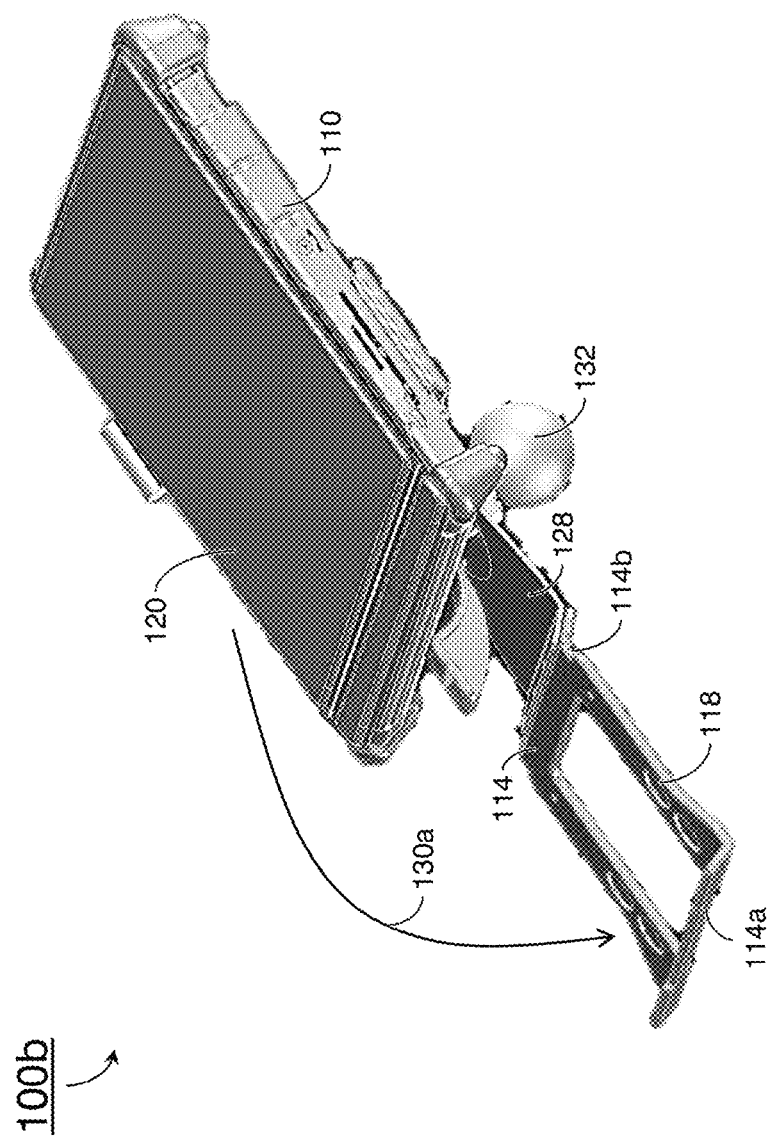

Referring to FIGS. 4-6, the protective case 100*b* may be implemented and may function similarly to the protective cases 100, 100*a*, except that the protective case 100*b* may incorporate a kickstand 114 extended by an easel bracket 128 attached to the rigid inner housing 102. For example, the easel bracket 128 may connect to the hinged end (114*b*) of the kickstand 114 via tabs configured to fit a matching set of holes (128*a*) in the easel bracket. The hinged end 114*b* of the kickstand 114 may be positioned at any desired angle to the easel bracket 128, such that the rubberized outer end 114*a* of the kickstand 114 may engage and support a portable keyboard 120 of the mobile device 110 (e.g., whether the mobile device 110 is a laptop computer or tablet-type device including a detachable portable keyboard). Referring in particular to FIGS. 4 and 5, the mobile device 110 and portable keyboard 120 may be supported by the kickstand 114 and easel bracket 128 at a substantially obtuse angle (130) for use, e.g., when the mobile device 110 is mounted for hands-free vehicular use via a ball mount 132. Referring in particular to FIG. 6, the kickstand 114 may be positioned at a substantially horizontal angle (130*a*) to the easel bracket 128 in order to support the portable keyboard 120 at a near horizontal angle to the mobile device 110.

We claim:

1. A ruggedized protective case for a mobile computing device, comprising:
    an inner housing configured to partially enclose a mobile computing device, the inner housing fashioned of a rigid material;
    an outer housing configured to partially enclose the inner housing, the outer housing fashioned of a flexible material and including one or more reinforced corners, each reinforced corner configured to provide impact protection to a corner of the mobile computing device;
    a kickstand having an inner portion coupled to the inner housing and an outer portion comprising a rigid core overmolded with the flexible material, the outer portion coupled to the inner portion by a hinged end and having a rubberized end opposite the hinged end and configured to engage and support a keyboard of the mobile device at a first angle to the mobile device, the outer portion positionable at a second angle of at most 180 degrees to the inner portion.

2. The ruggedized protective case of claim 1, wherein the mobile computing device includes at least one of a tablet, a laptop computer, and a smartphone.

3. The ruggedized protective case of claim 1, wherein the rigid core is at least partially fashioned of a passive magnetic material.

4. The ruggedized protective case of claim 3, wherein the inner housing includes at least one magnet configured to secure the kickstand to the inner housing by engaging with the passive magnetic material.

5. The ruggedized protective case of claim 4, wherein the at least one magnet is at least partially enclosed in a shield configured to insulate the mobile computing device from the at least one magnet.

6. The ruggedized protective case of claim 1, wherein the one or more reinforced corners include at least one corner tab coupled to the reinforced corner by a flexible cable, the corner tab configured to secure a covering to the mobile computing device.

7. The ruggedized protective case of claim 1, wherein:
    the rigid material includes a high impact plastic; and
    the flexible material includes a synthetic rubber.

8. The ruggedized protective case of claim 1, wherein the rubberized end is configured to conform to an edge of the inner housing when the kickstand is secured to the inner housing.

* * * * *